(12) United States Patent
Peacham (10) Patent No.: US 6,736,325 B1
(45) Date of Patent: *May 18, 2004

(54) CODELETS

(75) Inventor: Anthony David Peacham, Kent (GB)

(73) Assignee: Mondex International Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/229,714

(22) Filed: Jan. 13, 1999

Related U.S. Application Data (60) Provisional application No. 60/072,561, filed on Jan. 22, 1998.

(51) Int. Cl.⁷ ................................................. G06K 19/06
(52) U.S. Cl. ......................... 235/492; 235/487; 717/136
(58) Field of Search ................................. 712/209, 211; 717/136–148; 235/492, 487

(56) References Cited

U.S. PATENT DOCUMENTS 4,214,230 A    7/1980   Fak et al.

(List continued on next page.)

FOREIGN PATENT DOCUMENTS

| EP | 0152024 | 8/1985 |
|----|---------|--------|
| EP | 0157303 | 10/1985 |
| EP | 0190733 | 8/1986 |
| EP | 0218176 | 4/1987 |
| EP | 0261030 | 3/1988 |
| EP | 0275510 | 7/1988 |
| EP | 0292248 | 11/1988 |
| EP | 0325506 | 1/1989 |
| EP | 0328289 | 8/1989 |
| EP | 0354793 | 2/1990 |
| EP | 0451936 | 10/1991 |
| EP | 0466969 | 1/1992 |
| EP | 0475837 | 3/1992 |
| EP | 0547741 | 9/1992 |
| EP | 0537756 | 4/1993 |
| EP | 0540095 | 5/1993 |
| EP | 0559205 | 8/1993 |
| EP | 0588339 | 3/1994 |
| EP | 0594493 | 4/1994 |
| EP | 0636998 | 2/1995 |
| EP | 0647902 | 4/1995 |

(List continued on next page.)

OTHER PUBLICATIONS

Davies et al., "Security for Computer Networks; An Introduction to Data Security in Teleprocessing and Electronic Funds Transfer," John Wiley & Sons, 1984: pp. 192–194 and 327–331.

*Primary Examiner*—Zarni Maung
*Assistant Examiner*—G. Lawrence Opie
(74) *Attorney, Agent, or Firm*—Baker Botts L.L.P.

(57) ABSTRACT

A system and method for efficiently storing programming instructions in a microprocessor based system where codelets which include program instructions written in a non-native programming language (such as MEL or C) are stored in a read only portion of memory. The location of the codelets are stored in an address table which is accessed by an operating system when an application calls the codelet during execution. At that time, the microprocessor accesses the codelet instructions until the codelet function is complete. By storing codelets in read only memory which is cheaper and takes up much less physical space than alterable memory (such as EEPROM), more programming instructions can be stored in the same amount of physical space. Additionally, since codelets are written in non-native programming languages, they become platform independent since they can be compiled by different compilers to run on any platform.

24 Claims, 3 Drawing Sheets

U.S. PATENT DOCUMENTS

| | | |
|---|---|---|
| 4,218,582 A | 8/1980 | Hellman et al. |
| 4,259,720 A | 3/1981 | Campbell |
| 4,302,810 A | 11/1981 | Bouricius et al. |
| 4,305,059 A | 12/1981 | Benton |
| 4,321,672 A | 3/1982 | Braun et al. |
| 4,341,951 A | 7/1982 | Benton |
| 4,405,829 A | 9/1983 | Rivest et al. |
| 4,408,203 A | 10/1983 | Campbell |
| 4,423,287 A | 12/1983 | Zeidler |
| 4,442,345 A | 4/1984 | Mollier et al. |
| 4,453,074 A | 6/1984 | Weinstein |
| 4,467,139 A | 8/1984 | Mollier |
| 4,498,000 A | 2/1985 | Decavele et al. |
| 4,536,647 A | 8/1985 | Atalla et al. |
| 4,578,530 A | 3/1986 | Zeidler |
| 4,605,820 A | 8/1986 | Campbell, Jr. |
| 4,629,872 A | 12/1986 | Hällberg |
| 4,630,201 A | 12/1986 | White |
| 4,650,978 A | 3/1987 | Hudson et al. |
| 4,669,596 A | 6/1987 | Capers et al. |
| 4,705,211 A | 11/1987 | Honda et al. |
| 4,709,136 A | 11/1987 | Watanabe |
| 4,709,137 A | 11/1987 | Yoshida |
| 4,727,243 A | 2/1988 | Savar |
| 4,727,244 A | 2/1988 | Nakano et al. |
| 4,731,842 A | 3/1988 | Smith |
| 4,734,568 A | 3/1988 | Watanabe |
| 4,736,094 A | 4/1988 | Yoshida |
| 4,742,215 A | 5/1988 | Daughters et al. |
| 4,745,267 A | 5/1988 | Davis et al. |
| 4,746,788 A | 5/1988 | Kawana |
| 4,748,557 A | 5/1988 | Tamada et al. |
| 4,748,668 A | 5/1988 | Shamir et al. |
| 4,752,677 A | 6/1988 | Nakano et al. |
| 4,757,185 A | 7/1988 | Onishi |
| 4,757,543 A | 7/1988 | Tamada et al. |
| 4,759,063 A | 7/1988 | Chaum |
| 4,759,064 A | 7/1988 | Chaum |
| 4,767,920 A | 8/1988 | Kitta et al. |
| 4,778,983 A | 10/1988 | Ushikubo |
| 4,785,166 A | 11/1988 | Kushima |
| 4,786,790 A | 11/1988 | Kruse et al. |
| 4,797,542 A | 1/1989 | Hara |
| 4,797,920 A | 1/1989 | Stein |
| 4,798,941 A | 1/1989 | Watanabe |
| 4,802,218 A | 1/1989 | Wright et al. |
| 4,803,347 A | 2/1989 | Sugahara et al. |
| 4,811,393 A | 3/1989 | Hazard |
| 4,816,653 A | 3/1989 | Anderl et al. |
| 4,816,654 A | 3/1989 | Anderl et al. |
| 4,825,052 A | 4/1989 | Chemin et al. |
| 4,831,245 A | 5/1989 | Ogasawara |
| 4,833,595 A | 5/1989 | Iijima |
| 4,839,504 A | 6/1989 | Nakano |
| 4,839,792 A | 6/1989 | Iijima |
| 4,849,614 A | 7/1989 | Watanabe et al. |
| 4,853,522 A | 8/1989 | Ogasawara |
| 4,853,961 A | 8/1989 | Pastor |
| 4,874,935 A | 10/1989 | Younger |
| 4,877,945 A | 10/1989 | Fujisaki |
| 4,877,947 A | 10/1989 | Mori |
| 4,879,747 A | 11/1989 | Leighton et al. |
| 4,882,474 A | 11/1989 | Anderl et al. |
| 4,887,234 A | 12/1989 | Iijima |
| 4,891,503 A | 1/1990 | Jewell |
| 4,891,506 A | 1/1990 | Yoshimatsu |
| 4,900,904 A | 2/1990 | Wright et al. |
| 4,901,276 A | 2/1990 | Iijima |
| 4,906,828 A | 3/1990 | Halpern |
| 4,907,270 A | 3/1990 | Hazard |
| 4,926,480 A | 5/1990 | Chaum |
| 4,935,962 A | 6/1990 | Austin |
| 4,949,257 A | 8/1990 | Orbach |
| 4,961,142 A | 10/1990 | Elliott et al. |
| 4,969,188 A | 11/1990 | Schöbi |
| 4,977,595 A | 12/1990 | Ohta et al. |
| 4,984,270 A | 1/1991 | LaBounty |
| 4,985,615 A | 1/1991 | Iijima |
| 4,987,593 A | 1/1991 | Chaum |
| 4,993,068 A | 2/1991 | Piosenka et al. |
| 4,995,081 A | 2/1991 | Leighton et al. |
| 4,996,711 A | 2/1991 | Chaum |
| 5,001,753 A | 3/1991 | Davio et al. |
| 5,003,594 A | 3/1991 | Shinagawa |
| 5,005,200 A | 4/1991 | Fischer |
| 5,010,239 A | 4/1991 | Mita |
| 5,012,074 A | 4/1991 | Masada |
| 5,012,076 A | 4/1991 | Yoshida |
| 5,014,312 A | 5/1991 | Lisimaque et al. |
| 5,016,274 A | 5/1991 | Micali et al. |
| 5,038,025 A | 8/1991 | Kodera |
| 5,068,894 A | 11/1991 | Hoppe |
| 5,093,862 A | 3/1992 | Scwartz |
| 5,097,115 A | 3/1992 | Ogasawara et al. |
| 5,120,939 A | 6/1992 | Claus et al. |
| 5,128,997 A | 7/1992 | Pailles et al. |
| 5,131,038 A | 7/1992 | Puhl et al. |
| 5,142,578 A | 8/1992 | Matyas et al. |
| 5,146,499 A | 9/1992 | Geffrotin |
| 5,148,481 A | 9/1992 | Abraham et al. |
| 5,161,231 A | 11/1992 | Iijima |
| 5,162,989 A | 11/1992 | Matsuda |
| 5,163,098 A | 11/1992 | Dahbura |
| 5,164,988 A | 11/1992 | Matyas et al. |
| 5,165,043 A | 11/1992 | Miyahara et al. |
| 5,166,503 A | 11/1992 | Mizuta |
| 5,175,416 A | 12/1992 | Mansvelt et al. |
| 5,180,901 A | 1/1993 | Hiramatsu |
| 5,191,193 A | 3/1993 | Le Roux |
| 5,191,608 A | 3/1993 | Geronimi |
| 5,200,999 A | 4/1993 | Matyas et al. |
| 5,201,000 A | 4/1993 | Matyas et al. |
| 5,202,922 A | 4/1993 | Iijima |
| 5,214,702 A | 5/1993 | Fischer |
| 5,224,162 A | 6/1993 | Okamoto et al. |
| 5,243,175 A | 9/1993 | Kato |
| 5,247,578 A | 9/1993 | Pailles et al. |
| 5,276,903 A * | 1/1994 | Shinagawa |
| 5,293,577 A | 3/1994 | Hueske et al. |
| 5,371,797 A | 12/1994 | Bocinsky, Jr. |
| 5,420,405 A | 5/1995 | Chasek |
| 5,452,431 A | 9/1995 | Bournas |
| 5,473,690 A | 12/1995 | Grimonprez et al. |
| 5,485,520 A | 1/1996 | Chaum et al. |
| 5,511,121 A | 4/1996 | Yacobi |
| 5,517,011 A | 5/1996 | Vandenengel |
| 5,530,232 A | 6/1996 | Taylor |
| 5,534,857 A | 7/1996 | Laing et al. |
| 5,539,825 A | 7/1996 | Akiyama et al. |
| 5,542,081 A | 7/1996 | Geronimi |
| 5,544,246 A | 8/1996 | Mandelbaum et al. |
| 5,546,523 A | 8/1996 | Gatto |
| 5,557,516 A | 9/1996 | Hogan |
| 5,574,269 A | 11/1996 | Mori et al. |
| 5,578,808 A | 11/1996 | Taylor |
| 5,581,708 A | 12/1996 | Iijima |
| 5,588,146 A | 12/1996 | Leroux |
| 5,682,027 A | 10/1997 | Bertina et al. |
| 5,692,132 A | 11/1997 | Hogan |
| 5,699,528 A | 12/1997 | Hogan |
| 5,704,046 A | 12/1997 | Hogan |

| | | | | | | |
|---|---|---|---|---|---|---|
| 5,705,798 A | | 1/1998 | Tarbox | FR | 2667171 | 3/1992 |
| 5,708,780 A | | 1/1998 | Levergood et al. | FR | 2687816 | 8/1993 |
| 5,715,314 A | | 2/1998 | Payne et al. | GB | 2284689 | 6/1995 |
| 5,724,424 A | | 3/1998 | Gifford | JP | 64-81084 | 3/1989 |
| 5,796,831 A | | 8/1998 | Paradinas et al. | JP | 2592856 | 12/1996 |
| 5,825,875 A | | 10/1998 | Ugon | WO | WO8707062 | 11/1987 |
| 5,854,927 A | * | 12/1998 | Gelissen ............... 395/705 | WO | WO8809019 | 11/1988 |
| 5,864,689 A | * | 1/1999 | Tran ................. 712/208 | WO | WO9005960 | 5/1990 |
| 5,875,336 A | * | 2/1999 | Dickol et al. ........... 395/705 | WO | WO9116691 | 10/1991 |
| 5,923,884 A | * | 7/1999 | Peyret et al. ........... 395/712 | WO | WO9213322 | 8/1992 |
| 5,937,193 A | * | 8/1999 | Evoy ................. 395/705 | WO | WO9320538 | 10/1993 |
| 6,035,380 A | * | 3/2000 | Shelton et al. ........... 711/163 | WO | WO9321612 | 10/1993 |
| 6,105,125 A | * | 8/2000 | Nemirovsky et al. | WO | WO9522810 | 8/1995 |
| 6,308,317 B1 | * | 10/2001 | Wilkinson et al. ........ 717/5 | WO | WO9619771 | 6/1996 |
| 6,357,655 B1 | * | 3/2002 | Ralli ................. 235/95 R | WO | WO9628795 | 9/1996 |
| | | | | WO | WO9638825 | 12/1996 |
| | | FOREIGN PATENT DOCUMENTS | | WO | WO9843212 | 10/1998 |
| EP | | 0666550 | 8/1995 | WO | WO9101538 | 2/1999 |
| EP | | 0707290 | 9/1995 | WO | WO9910824 | 3/1999 |
| EP | | 0686947 | 12/1995 | WO | WO9916031 | 4/1999 |
| EP | | 0751460 | 1/1997 | | | |
| FR | | 2536928 | 6/1984 | * cited by examiner | | |

CODELETS

PRIORITY APPLICATION

This application claims priority to United States Provisional application 60/072,561 filed on Jan. 22, 1998, and entitled "CODELETS", which is hereby incorporated by reference.

RELATED APPLICATION

This application is related to U.S. application Ser. No. 09/064,915 filed on Apr. 23, 1998, entitled "MULTI-APPLICATION IC CARD WITH DELEGATE FEATURE" and assigned to Mondex International Limited, which is hereby incorporated by reference.

FIELD OF INVENTION

This application relates to the system and method for improving the storage capacity and efficiency of memory management in an integrated circuit card through the selective storage of programming instructions.

BACKGROUND OF INVENTION

Integrated circuit (IC) cards are becoming increasingly used for many different purposes in the world today. An IC card typically is the size of a conventional credit card which contains a computer chip including a microprocessor, read-only-memory (ROM), electrically erasable programmable read-only-memory (EEPROM), an Input/Output (I/O) mechanism and other circuitry to support the microprocessor in its operations. An IC card can be application specific or may contain multiple applications in memory. MULTOS™ is a multiple application operating system which runs on IC cards, among other platforms, and allows multiple applications to be executed on the card itself This allows a card user to run many programs stored in the card (for example, credit/debit, electronic money/purse and/or loyalty applications) irrespective of the type of terminal (i.e., ATM and/or POS) in which the card is inserted for use.

IC cards typically have limited storage capacity due to the size and cost restraints of locating memory on the card. Multi-application smart cards have their applications written in a programming language that are typically stored in the EEPROM whose contents can be changed during the lifetime of the card. One example of a programming language used in IC cards is Multos Executable Language (MEL). The MEL program instructions are read from EEPROM, an alterable memory, when they are executed and are interpreted by the operating system stored in ROM.

The ROM on the IC card includes the operating system written in assembly language code for the particular integrated circuit configuration (native language type code). The operating code stored in ROM is fixed when the ROM is initially written and the information stored in ROM will not change for the life of the card.

One of the concerns with multi-application IC cards is that when attempting to store multiple applications on the card, the memory constraints of the EEPROM becomes significant. Currently, the size of a typical EEPROM on an IC card is 8K bytes. The size of an application program may be 3.3K for an electronic money (purse) application. Moreover, the application typically has data associated with the code, which could be about 3K bytes of memory for an electronic money application. Therefore, the application including the code and the data typically requires 6.6K of memory space. In addition, the operating system requires data to be stored in EEPROM, which data is used during the operation of the operating system. This overhead requirement is generally about 1K of space in EEPROM. Consequently, if a purse application is stored in EEPROM, 7.6K of memory will be needed, leaving only 0.4K of EEPROM available for a second application. This is not an acceptable option for an efficient and effective multi-application IC card system.

With regard to memory space in ROM, a typical multiple application operating system code requires 17.5K of the 24K of available memory in ROM. Therefore, 6.5K of ROM is unused and can never be used after the card is distributed to the public because ROM can only be configured once. Moreover, ROM memory is approximately six times more dense than EEPROM memory, meaning that 1K of EEPROM takes up six times more room on the chip than 1K of ROM. As a result, it would be advantageous to (1) fully utilize any unused memory space in ROM and (2) use as much ROM as possible instead of EEPROM to minimize the size of memory on the integrated circuit in the card.

SUMMARY OF THE INVENTION

The invention is directed to a system and method of efficiently storing programming instructions in a microprocessor based system with memory size and/or cost constraints, such as an IC card. Codelets include programming instructions written in non-native code and are stored in a read-only portion of memory. The memory address of the codelet is stored in an address table which the operating system for the microprocessor based system accesses in order to execute the codelet. An application residing in the alterable portion of memory will call the codelet to be executed with a program instruction, and the operating system will look up the memory address of the codelet from the address table and execute the codelet's program instructions to perform its designated function. By storing the codelet in read-only memory, the programming instructions are stored in a memory which is cheaper and physically smaller than alterable memory so more overall programming instructions can be stored in the overall memory system. Additionally any extra space in the read-only memory can be fully utilized by using the codelets.

The codelet is written in a non-native programming language such as MEL or C so that the instructions will be interpreted by the operating system in order to execute them. This allows different platforms to use the same codelet because each operating system will convert the non-native programming instructions to machine readable instructions for the particular microprocessor. Thus the codelets can be used with different types of platforms without the need to translate the instructions for specific microprocessors. When the codelets are executed, they will act upon the data used by the application which accessed the codelet in a preferred embodiment.

BRIEF DESCRIPTION OF THE DRAWINGS

Further objects, features and advantages of the invention will become apparent from the following detailed description taken in conjunction with the accompanying figures showing illustrative embodiments of the invention, in which.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE INVENTION

A solution to the objective of the full utilization of ROM and efficient overall use of memory is accomplished through the use of "codelets," which are sets of instructions written in a programming language (not native language code). These codelets can be stored in ROM so as to maximize the usage of memory and allow ROM to store complete applications as well as primitives. The codelet can be as small as one instruction or as large as will fit into the remaining ROM memory space. For example, the purse application described in the background can be stored in ROM when the card is initialized in order to free up space in EEPROM, the alterable memory, for additional applications which can be loaded at any time.

The codelet is assigned a name and that name is placed in an address table stored in EEPROM. When a codelet is called by another application, the address table gives the location of the first instruction in the codelet stored in ROM and each instruction is executed just as if the application were stored in EEPROM.

Also present in ROM can be subroutines called primitives written in a native language code for the microprocessor which can be called by either the operating system itself or by applications when they are executed. Primitives are written in the native language (i.e. assembler language) so that they can be executed very quicky and minimal interpretation of the instructions is necessary for execution. These primitives are collections of instructions which typically perform a desired function, such as a mathematical function. The instructions are never changed during the lifetime of the card. Any data used or accessed by the primitives are stored in EEPROM so that the contents of the data elements can change as necessary. Primitives are different than codelets because they are written in the native language code. Codelets allow programmers to use an easier and more programmer friendly programming language such as MEL or "C." Programming languages also allow programmers to do advanced features which may be hard to directly implement in an assembler native language.

Figure 1:
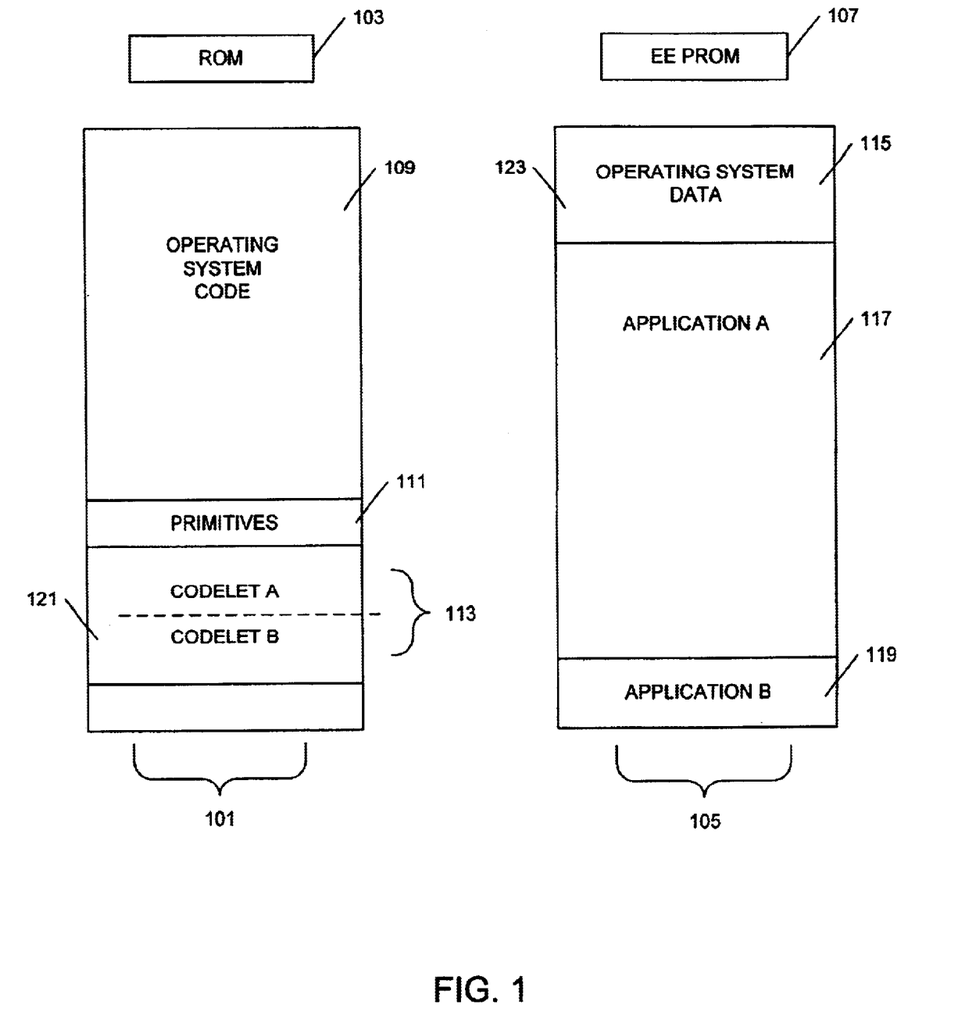
FIG. 1 is a diagram of the memory of an IC card configured in accordance with the invention.

FIG. 1 shows an example of the memory configuration of ROM 101 (indicated by label 103) and of EEPROM 105 (indicated by label 107) which are located on an IC card. ROM 101 includes operating system code 109 stored in native language code (e.g., assembly language) which is run by the microprocessor to operate any application and perform card functions. Also stored in ROM are primitives 111 which are sets of instructions stored in the native language code on ROM and which are called by the operating system and/or an application being run on the card. Codelets 113 are sets of instructions stored in a programming language form (e.g., in MEL) in ROM which are called by another application or codelet. The operating system will not call codelets directly as part of the operating code because of the high speed required by the operating system. Program instruction sets called by the operating system are preferably primitives written in the native language codes.

Operating system data 115 is stored in EEPROM 105. This data is necessary for the operation of the operating system and is unavailable for applications to utilize. Application A space 117 comprising program code and data is entirely stored on EEPROM 105 and takes up most of the available space in the memory. Application B space 119 has very few lines of code and calls the codelet B 121 which is stored in ROM 101. The data associated with application B is stored in the EEPROM because the data may change. This configuration allows multiple applications to reside in EEPROM memory 105 by storing large blocks of code in ROM and calling the codelet instructions. A codelet address table 123 resides in EEPROM 105 as part of the operating system data. This allows the operating system to locate the codelet when an application calls the codelet. Alternatively, the codelet address table 123 could reside in ROM 101 for addresses known when the card is first manufactured.

While EEPROM 105 is described as a preferred embodiment of an alterable memory, any other memory whose contents can be changed can also be used as an alterable memory.

As memory storage capabilities of EEPROM get larger with time, memory management will continue to be an important concern because more and more applications will be available on the card. Thus, a user of the card may choose different combinations of purse applications, credit/debit applications, loyalty programs such as frequent flyer reward programs, health information programs or catalog ordering programs. Each application will require a finite amount of space on the card and codelets will help utilize available memory space efficiently.

A codelet can be stored in EEPROM as well as in ROM, or any other memory area which can be addressed by the card. This includes additional EEPROMs if present or even external memory units which are accessible by the card. Codelets could also contain discrete portions of programs so that part of a program will reside in EEPROM and part of a program as a codelet on ROM. The codelet can be called by one or more applications which are executed. A codelet is written in the application language (e.g. MEL) and is considered part of the program no matter where it resides.

Applications written in an application language will preferably run on a number of different platforms (i.e. different integrated circuits made by different manufacturers or different integrated circuit models made by the same manufacturer). It is desirable to have an application written once and allow the particular IC card to compile the application code to run the code. A primitive is written in native language code which is specific to the platform it resides on. A primitive for one platform will not run on the platform of a different manufacturer. Codelets transcend the limitations of a specific platform by being written in a program language which can be stored on any platform without lengthy pre-processing or without having to rewrite the code to fit the platform.

Codelets applicability are not restricted simply to IC cards, but can also be used in other microprocessor systems with memory constraints such as a computer watch or other item containing a processor.

Figure 2:
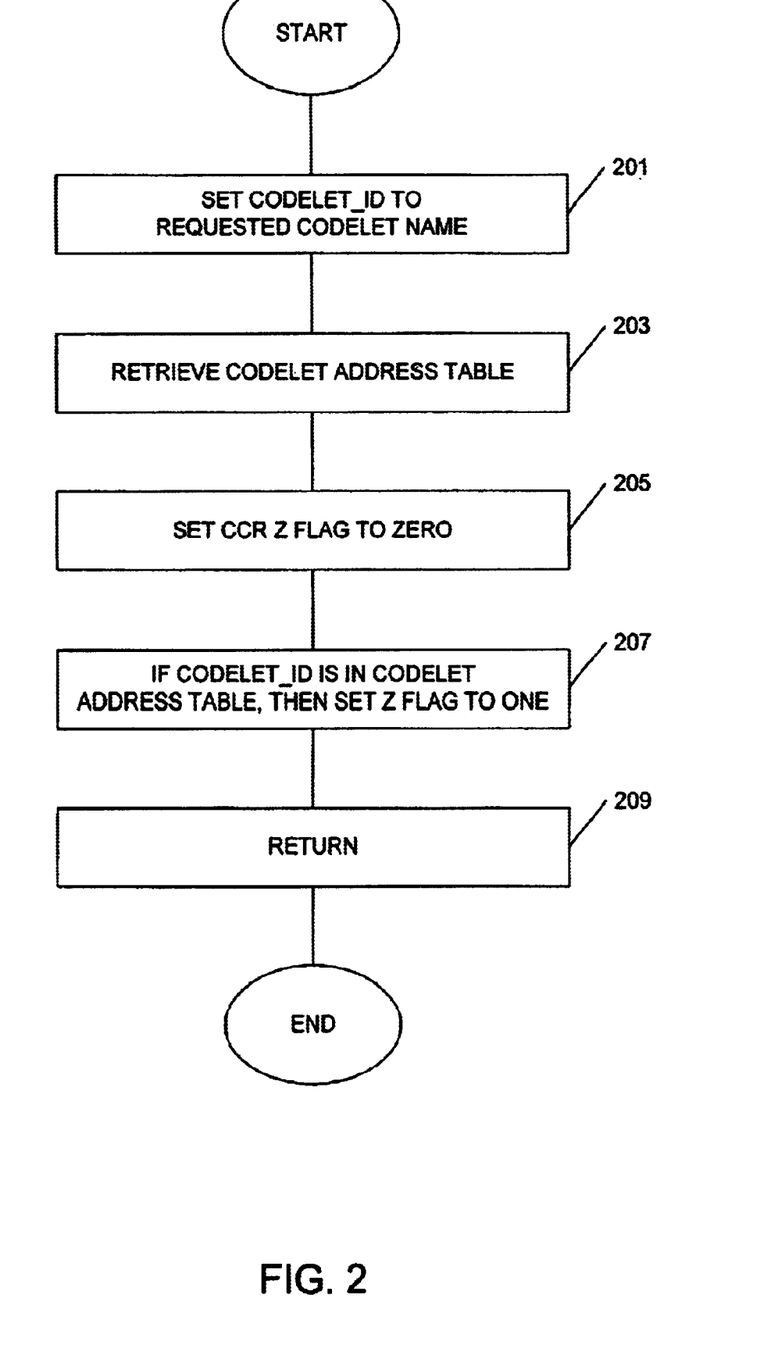
FIG. 2 is a flowchart of the steps for performing a codelet query.

FIG. 2 is a flow chart of the steps for performing a query codelet. If an application needs to determine that a codelet has been stored on the IC card before it is called, it can execute a query codelet function. The query codelet function is a series of program instructions that can be stored as a primitive. The query codelet function will check the address table stored in the memory of the IC card for the name of the codelet which is being checked. If the codelet name has been stored, then a flag indicator such as the zero (Z) flag of a conventional Condition Code Register (CCR) is set to one (indicating a positive response) and the application can then successfully call the codelet which has just been checked. If the name of the codelet is not present in the address table, then a zero will be placed in the Z flag (indicating a negative response) and the application will not call the codelet to avoid an execution error and/or an abnormal end to the execution of the application.

Step 201 sets the variable codelet_id equal to the name of the requested codelet to be checked. The name can be any combination of letters, numbers or characters which identify the codelet. If the requested codelet name is zero, a predetermined wild card, then a match to a codelet name in the address table is always made and the Z flag is always set to one (a positive response). Step 203 then retrieves the address table from the memory of the IC card and in particular the portion containing the addresses of any stored codelets.

Step 205 sets the CCR Z flag to zero. The CCR register is preferably used as a mechanism to relay the answer to the codelet query to the application or other program instructions requesting the query. The CCR register is used because it is very fast and enables the requesting application to determine the outcome of the request without transferring data or looking up further variables in designated memory areas. The default response to a codelet query is negative indicating that the codelet has not been stored on the IC card. The negative response is indicated by a zero value in the Z bit of the CCR register.

Step 207 checks if the name stored in codelet_id is present in the codelet address table, and if it is the Z flag in the CCR register is set to a positive state. A comparison is made of the codelet_id variable to the names of codelets in the address tables. If a match does not occur, the Z flag remains set to zero in the negative state. If a match occurs, then the codelet has already been stored and its name properly placed in the address table so the Z flag is set to a positive state, i.e. one. If codelet_id is set to a value of zero, then an automatic match is recorded. This wild card feature can be used as needed by the programmer.

Step 209 then returns control of the processor to the application or other instruction set which inquired about the status of the codelet. The application can then successfully pass control of the microprocessor to the codelet instructions and have the codelet instructions executed if the codelet was found in the address table. If the codelet name was not found, the application can execute alternative instructions based on the negative result of the codelet check. The application developer can program for both alternatives.

Additional operational primitives besides query_codelet can also be used in connection with codelets. A call_codelet primitive can be used to pass control over from the application to the codelet called in order to execute the codelet instructions. The codelet to be executed is identified by the specific codelet ID. If the request codelet ID is set to zero a predetermined special value, then a specific known codelet address can be used to identify and execute the codelet outside of the address table. If the codelet_id is not zero, then the address for the codelet is looked up on the address table and that address is used to locate the start of the program instructions for the codelet. If the codelet ID is non-zero but does not appear in the address table, then an abnormal end occurs. However, this error can be avoided by performing a query_codelet function as described above.

The call_codelet function can be used, for example, to (1) pass control from an application to a codelet; (2) pass control from one codelet to another; or (3) pass control from a codelet to itself (which may be done for program memory management or other iterative programming reasons). The codelet acts on the data segment of the calling application and preferably has no data of its own. This ensures that there is no possibility of data leakage between applications and keeps the data secure and uncorrupted. The codelets utilize the program and data stacks and the application abstract architecture machine as described in U.S. application Ser. No. 09/064,915 entitled "Multi-Application IC Card With Delegate Feature" which has been incorporated by reference.

An efficient architecture for processing multi applications in an IC card is termed an Application Abstract Machine (AAM) architecture. The AAM Architecture applies to any platform independent of its hardware and enables developers to write applications to store on the IC cards which are portable across many different types of platforms (e.g., IC cards built by different manufacturers with different processor configurations) without the need for knowledge about the specific hardware of the platform.

An application abstract machine (AAM), a term for the memory allocation and organization for the data stored and used by each application, is created for each application stored on the IC card which is executed by the processor on the card. In order to ensure data integrity and security when data is transferred between applications which are executed on the IC card, only one application on the IC card is allowed to be executed at a time. Each application has a data memory space which is virtually allocated and mapped onto the physical memory addresses available in the IC card memories. Data is then passed between two or more applications within a specified memory location and in a manner consistent with transferring data to an external terminal or device with which the IC card is securely interacting. At a general level, each AAM space created for each application being executed includes two separate address spaces, one for the program code itself and one for the program data which is stored and/or used by the application. The program data address space is effectively divided into three segments: a Static segment, a Dynamic segment and a Public segment. The Static, Dynamic and Public segments are logically mapped to the physical memory; they are virtual memory segments as opposed to physical memory segments. The AAM data address space is preferably addressed and processed using seven different address registers and two control registers.

In a multi-application operating system, the operating system can configure each application to have its own logical address space. Each application therefore operates independently and if one application calls another application, the communication will follow procedures similar to talking to a terminal. This type of configuration ensures the integrity of the logical address space and enhances security of data flow between applications. Codelets, which can contain substantially all, or possibly all, of the instruction lines of the code, are written in the application language. By calling a codelet, the logical space for an application is maintained and the application instructions are simply located in a more efficient memory location. Moreover, because the I/O like parameters which are required between applications are not invoked when the codelet is called, codelets allow extra flexibility and efficiency in the operation of the IC card.

The pointers to the AAM data segments can be redirected when a codelet is called. Thus, where a codelet is stored in EEPROM, the static segment of the memory of the AAM will be made up of the codelet instructions while the dynamic segment of memory will still be that of the original application calling the codelet. This allows the codelet to perform its function on the applicable data and then return control to the application when it is complete. Because the codelets are preferably stored in a read-only type memory, codelets typically do not have their own variable data but instead use the data from the application in a secure manner.

When control of the IC card processing switches from an application or other codelet to the codelet called, it is important that the operating system know the correct address of the codelet program instructions. Although the address of the codelet is stored in the address table, an additional check can be performed by setting an upper boundary so that the fetched instructions of the codelet by the operating system will be from a valid memory location. This primitive is called set_code_boundaries.

Figure 3:
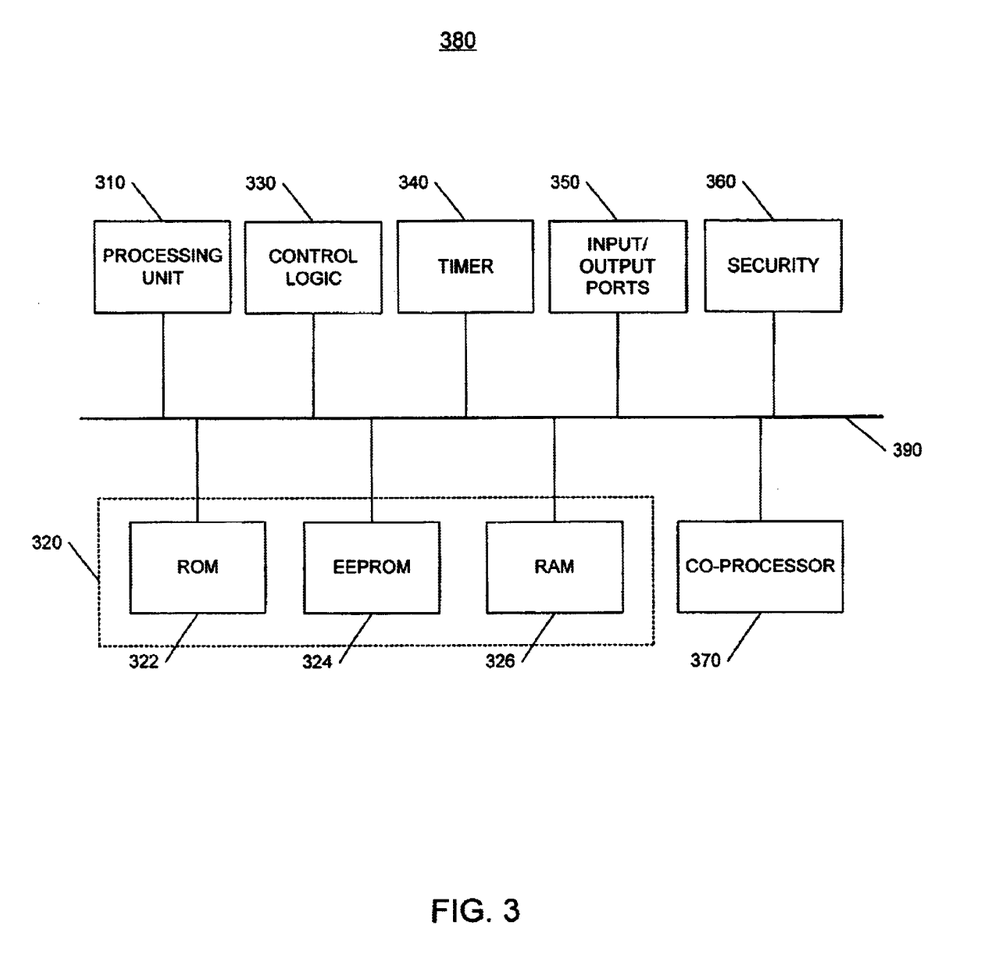
FIG. 3 is a block diagram of an IC card chip which can be used in accordance with the invention.

FIG. 3 shows an example of a block diagram of an integrated circuit 380 located on an IC card chip which can be used in conjunction with the invention. The integrated circuit chip is located on a chip on the card. The IC chip preferably includes a central processing unit 310, memory 320 including a RAM 326, a EEPROM 324, a ROM 322, a timer 340, control logic 330, I/O ports 350 and security circuitry 360, which are connected together by a conventional data bus 390 or other conventional means.

Control logic 330 in the smart card provides sufficient sequencing and switching to handle read-write access to the card's memory through the input/output ports 350. CPU 310 in conjunction with control logic 330 can perform many different functions including performing calculations, accessing memory locations, modifying memory contents, and managing input/output ports. Some IC cards also include a coprocessor 370 for handling complex computations like cryptographic algorithms. Input/output ports 350 are used for communication between the card and an interface device (IFD) which transfers information to and from the card. Timer 340 (which generates and/or provides a clock pulse) drives the control logic 330, CPU 310 and other components requiring a clock signal through the sequence of steps that accomplish functions including memory access, memory reading and/or writing, processing, and data communication. Security circuitry 360 (which is optional) preferably includes fusible links that connect the input/output lines to internal circuitry as required for testing during manufacture, but which are destroyed upon completion of testing to prevent later access.

The Static memory space is preferably mapped to memory locations in EEPROM 324 which are non-volatile. The Dynamic memory space is preferably mapped to RAM 326 which is volatile memory which has quick access. The Public memory space is also preferably mapped to RAM 326 which is volatile memory. The Dynamic data and Public data will be stored in different portions of RAM 326, while ROM is identified as a preferred non-volatile memory and EEPROM is identified as a preferred non-volatile, alterable memory. An operating system is preferably stored in ROM 322. One or more codelets are also preferably stored in ROM 322. The address table and one or more applications and codelets are preferably stored in EEPROM 324. Other types of memory could also be used with the same characteristics.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

I claim:

1. An integrated circuit card comprising:

a read-only memory;

an alterable memory;

a microprocessor coupled to said read-only and alterable memory;

an operating system stored in said read-only memory, wherein said operating system is executed by said microprocessor;

at least one application stored in said alterable memory; and a codelet stored in said read-only memory and comprising at least one non-native program instruction written in a programming language capable of being converted for execution by said microprocessor.

2. The integrated circuit card of claim 1, wherein said alterable memory comprises an EEPROM.

3. The integrated circuit card of claim 1, wherein one of said application's program instructions calls said codelet.

4. The integrated circuit card of claim 1, further comprising an address table for storing said memory address and identifier of said stored codelet.

5. The integrated circuit card of claim 4, wherein said address table is stored in said alterable memory.

6. The integrated circuit card of claim 4, wherein said operating system executes said codelet by looking up said codelet's memory address in said address table using said codelet's identifier.

7. The integrated circuit card of claim 1, further including a primitive stored in said read-only memory.

8. The integrated circuit card of claim 7, wherein said primitive verifies said codelet's presence on said IC card.

9. The IC card of claim 8, further including a register indicative of said codelet's presence.

10. The integrated circuit card of claim 7, wherein said codelet executes said primitive.

11. The integrated circuit card of claim 10, wherein said execution of said primitive uses an address table look up to determine said primitive's memory location.

12. A method for efficiently storing programming instructions in a microprocessor system including read-only memory and alterable memory comprising the steps of:

storing an operating system in said read-only memory;

storing at least one application written in a non-native computer language in said alterable memory;

storing a codelet comprising program instructions written in a non-native computer language which is a programming language capable of being converted for execution by said microprocessor, in said read-only memory; and storing said codelet's address location in an address table;

wherein said codelet is accessed by said operating system using said address table, and further wherein said read-only memory and said alterable memory are part of an integrated circuit card.

13. The method of claim 12, wherein said alterable memory comprises EEPROM.

14. The method of claim 12, wherein one of said application's program instructions calls said codelet.

15. The method of claim 12, wherein said address table is stored in said alterable memory.

16. The method of claim 15, wherein said operating system executes said codelet by looking up said codelet's memory address in said address table.

17. The method of claim 12, wherein said address table is stored in said read-only memory.

18. The method of claim 12, further including the step of storing a primitive in said read-only memory.

19. The method of claim 12, wherein said non-native computer language of said at least one application is said non-native computer language of said codelet.

20. The method of claim 12, further including the step of verifying the presence of said codelet on said IC card.

21. A system for efficiently storing programming instructions in a microprocessor system comprising:

a read-only memory storing an operating system and at least one codelet, wherein said codelet comprises program instructions written in a non-native programming language requiring interpretation by said operating system; and an alterable memory storing at least one application comprising program instructions and data and an address table;

wherein said memory address and identifier of said codelet is stored in said address table and said codelet is accessed by said at least one application during said application's execution, and further wherein said microprocessor system resides on an integrated circuit card.

22. The system of claim 21, wherein said codelet's program instruction utilizes said application's data.

23. The system of claim 21, further including a means for verifying said codelet's presence in said read-only memory.

24. The system of claim 21, wherein said operating system executes said codelet by looking up said codelet's memory address in said address table using said codelet's identifier.

* * * * *